Patented Dec. 13, 1932

1,890,772

UNITED STATES PATENT OFFICE

HARRY B. DYKSTRA, OF WILMINGTON, DELAWARE, ASSIGNOR TO E. I. DU PONT DE NEMOURS & COMPANY, OF WILMINGTON, DELAWARE, A CORPORATION OF DELAWARE

CHLORINATION OF META STYRENE

No Drawing. Application filed January 28, 1930. Serial No. 424,133.

This invention relates to new compositions of matter. More specifically it relates to synthetic resins. Still more particularly it relates to the production of such resins by the chlorination of meta styrene, and to their use as plastics and in coating compositions.

An object of this invention is the preparation of new compositions of matter. Another object of this invention is the preparation of new compositions of matter, having superior physical and chemical properties, from meta styrene. Another object is the formation of coating and plastic compositions containing these compositions of matter. A still further object is the chlorination of meta styrene. Other objects will become apparent as the description proceeds.

These objects are accomplished, generally speaking, by chlorinating meta styrene in a suitable solvent under conditions which favor nuclear substitution, namely the absence of light, low temperature, and the presence of a halogen carrier.

Meta styrene, otherwise known as polymerized vinyl benzene, is a resinous substance useful as a constituent of plastic and coating compositions.

I have discovered that the incorporation of halogen in the meta styrene complex is particularly desirable because the resulting composition has excellent resistance to gasoline, less thermoplasticity than meta styrene, excellent retention of flexibility on aging, excellent adhesion, and excellent durability.

In order to obtain a stable, chlorinated product from meta styrene, I introduce the chlorine into the nucleus rather than in the side chain because I find that the resin with a halogen atom substituted in the nucleus or ring is much less reactive than the resin with a halogen atom substituted in a side chain. The presence of a reactive halogen in a resin renders it unsuitable for most purposes.

Since the chlorination of meta styrene in the solid or molten state is attended with difficulties, I carry out the reaction in a suitable solution. The common lacquer solvents being too reactive to use for this purpose, it became necessary to find suitable ones. Tetrachloroethylene, tetrachloroethane, and carbon tetrachloride are solvents for meta styrene which serve the purpose, but I prefer to use carbon tetrachloride because of its cheapness, its non-reactivity, and because its low boiling point makes its removal from the product by distillation an easy matter.

The chlorination of meta styrene is carried out in the dark at about 0° C., using a halogen carrier such as iron chloride or aluminum chloride. The absence of light, the employment of low temperature, and the presence of halogen carriers favor nuclear halogen substitution. The chlorine is introduced into a carbon tetrachloride solution of meta styrene, preferably with stirring, at such a rate that absorption of chlorine is complete. When the desired amount of chlorine has been introduced, as measured by a flowmeter, the reaction mixture is allowed to remain in a cold, dark place until all the chlorine has reacted. The product is then separated from the reaction mixture by a process consisting in filtering to remove any solid catalyst, washing with dilute alkali to remove hydrogen chloride and dissolved catalyst, and precipitating the product as a white powder by pouring into alcohol. In place of precipitating the chlorinated meta styrene by pouring it into a non-solvent such as alcohol, it may also be obtained as a resinous mass by removing the carbon tetrachloride by distillation, preferably under reduced pressure. I find that the products thus obtained are soluble in aromatic hydrocarbons and in the ordinary ester solvents.

The process for the chlorination of meta styrene described above is applicable to all types of meta styrene. I find that the chlorination of meta styrene having a high molecular weight, such as the polymers prepared in the absence of a cataylst, renders them suitable for use in spraying compositions. Before chlorination, solutions of these polymers cannot be sprayed satisfactorily due to cobwebbing.

Considerable variation in the physical properties of the products may be obtained by varying their chlorine content. Among products prepared from the same sample of meta styrene, the product having the highest percentage of chlorine has the highest melting point, the lowest viscosity characteristics, and gives films which dry most rapidly.

Examples illustrating the process for chlorinating meta styrene and a typical composition in which they may be used are given below:

Example I

A mixture of 300 g. meta styrene prepared by heating a solution of styrene in the absence of a catalyst, 2200 g. carbon tetrachloride, about 10 g. water, and 10 g. iron filings was treated with chlorine at 0°–1° C. at a rate of about 1.4 g. per minute for three hours. The reaction mixture was kept in a cold, dark room for twenty-four hours and was then filtered. The filtrate was washed first with dilute sodium hydroxide solution until all the hydrogen chloride and iron chloride were removed, and then with water. The greater portion of the carbon tetrachloride was removed by distillation under reduced pressure. The residue was poured into alcohol which caused the chlorinated meta styrene to separate as a white powder.

Example II

A mixture of 156 g. of meta styrene of the same type as that used in Example I, 1500 g. carbon tetrachloride, and five grams iron filings was treated with chlorine in the dark at 3–16° C. until an increase in weight of 120 g. was obtained. The chlorinated product, isolated as in Example I, weighed 233 g. and contained 34.3% chlorine. Twenty-five per cent solutions of the product could be sprayed satisfactorily, whereas, due to cobwebbing, solutions of the original meta styrene could not be sprayed satisfactorily even in 15% concentration.

Example III

A solution of 52 g. meta styrene (prepared by heating a solution of styrene in the presence of benzoyl peroxide) in 500 g. carbon tetrachloride containing 0.5 g. aluminum chloride was treated with chlorine in the dark at 20–25° C. until an increase in weight of 17 g. was obtained. The product was isolated as in the preceding examples. Analysis showed that the product contained 26.8% chlorine.

Example IV

A typical spraying enamel prepared from the chlorinated product of Example I had the following composition:

|   | Per cent |
|---|---|
| Chlorinated meta styrene | 20.6 |
| Dibutyl phthalate | 6.2 |
| Chrome yellow | 11.5 |
| Benzene | 9.2 |
| Toluene | 27.8 |
| Xylene | 24.7 |
|   | 100.0 |

This enamel had a viscosity of about 0.4 poise at 25° C. and had satisfactory spraying properties. The films became tack-free within 50 minutes and were hard within 120 minutes. The films were much less thermoplastic, more resistant to gasoline, and about three times as durable as those of a meta styrene enamel having the same percentage composition. They were also superior to films of polymerized chlorostyrene in these respects.

An advantage of this invention is that meta styrene is converted into a more useful product. Another advantage is that the undesirable properties possessed by meta styrene, which rendered its use in a plastic or coating composition difficult, are overcome. Yet another advantage is that a new composition of matter is formed. A still further advantage is that these resins have a higher melting point than the styrene from which they are prepared and that they are consequently less thermoplastic. A further advantage is that films of coating compositions which contain the product of my invention are harder, tougher, more durable and more resistant to gasoline than those of meta styrene.

As many apparently widely different embodiments of this invention may be made without departing from the spirit and scope thereof, it is to be understood that I do not limit myself to the specific embodiments thereof except as defined in the appended claims.

I claim:

1. Chlorinated meta styrene.
2. The product derived from the treatment of meta styrene with chlorine under conditions which favor nuclear substitution.
3. The product derived from the treatment in the dark of a solution containing meta styrene with chlorine in the presence of a halogen carrier.
4. The product derived from the treatment in the dark, at a low temperature, of a carbon tetrachloride solution of meta styrene with chlorine in the presence of water and iron filings.
5. The method of chlorinating meta styrene consisting in treating a solution of meta styrene with chlorine under conditions which favor nuclear substitution.
6. The method of chlorinating meta styrene consisting in treating a solution of meta styrene in the dark with chlorine in the presence of a halogen carrier.

7. The method of chlorinating meta styrene consisting in treating a solution of meta styrene in carbon tetrachloride in the dark at a low temperature with chlorine in the presence of water and iron filings.

8. The method of preparing chlorinated meta styrene consisting in treating a solution of meta styrene in carbon tetrachloride in the dark, at a low temperature, with chlorine in the presence of water and iron filings, washing with sodium hydroxide, washing with water, distilling off carbon tetrachloride, and precipitating the chlorinated meta styrene by treatment with alcohol.

In testimony whereof, I affix my signature.

HARRY B. DYKSTRA.